(12) United States Patent
Tsai et al.

(10) Patent No.: US 7,340,750 B2
(45) Date of Patent: Mar. 4, 2008

(54) TRANSMISSION ASSEMBLY WITH A LOCK GATE STRUCTURE FOR AN OPTICAL DISC DEVICE FOR PREVENTING PIECES OF AN OPTICAL DISC FROM ESCAPING THE OPTICAL DISC DEVICE

(75) Inventors: Chang-Chih Tsai, Sanchong (TW); Hui-Chun Wang, Chung Ho (TW)

(73) Assignee: Ultima Electronics Corp., Taipei Hsien (TW)

( * ) Notice: Subject to any disclaimer, the term of this patent is extended or adjusted under 35 U.S.C. 154(b) by 596 days.

(21) Appl. No.: 11/021,815

(22) Filed: Dec. 22, 2004

(65) Prior Publication Data

US 2006/0136945 A1 Jun. 22, 2006

(51) Int. Cl.
*G11B 17/04* (2006.01)
(52) U.S. Cl. .................................... 720/617
(58) Field of Classification Search ............. 720/617, 720/639, 646, 604; 360/99.02, 99.06, 99.12
See application file for complete search history.

(56) References Cited

U.S. PATENT DOCUMENTS

| | | | | |
|---|---|---|---|---|
| 5,060,096 A | * | 10/1991 | Hirose et al. | 360/99.12 |
| 5,173,894 A | * | 12/1992 | Kido | 720/623 |
| 5,297,117 A | * | 3/1994 | Uzuki et al. | 720/634 |
| 5,452,280 A | * | 9/1995 | Yamamori et al. | 720/604 |
| 6,181,510 B1 | * | 1/2001 | Fujiura | 360/99.06 |
| 7,271,979 B2 | * | 9/2007 | Komatsu et al. | 360/99.02 |

* cited by examiner

*Primary Examiner*—Tianjie Chen
(74) *Attorney, Agent, or Firm*—Alan Kamrath; Kamrath & Associates PA

(57) ABSTRACT

An optical disc device includes a budging mechanism, a transmission assembly, a disc holding down plate, and a lock gate structure. The budging mechanism is moved by mechanically interfering with the optical disc entering the working area of the optical disc device to drive the transmission assembly mounted on one side of the optical device so as to further operate the disc holding down plate and the lock gate structure. In such mechanical connections, the working timing of all the device and mechanisms can be controlled so as to drive the lock gate to open or close the loading slot in the right time.

10 Claims, 14 Drawing Sheets

TRANSMISSION ASSEMBLY WITH A LOCK GATE STRUCTURE FOR AN OPTICAL DISC DEVICE FOR PREVENTING PIECES OF AN OPTICAL DISC FROM ESCAPING THE OPTICAL DISC DEVICE

BACKGROUND OF THE INVENTION

1. Field of the Invention

The present invention relates to a transmission assembly with a lock gate structure for an optical disc device to prevent pieces of an optical disc from flying out of the optical disc device, and more particularly to an optical disc device provided with a transmission assembly to control movement of the lock gate structure so as to open or close the loading slot of the optical disc device.

2. Description of the Related Art

A conventional slot-in optical disc device, such as DVD-ROM, VCD-ROM, CD-ROM and onboard audio system, is provided with a sensor to automatically detect insertion of an optical disc in the loading slot and start the conveying mechanism.

The conventional slot-in optical disc device does not have a carry tray to carry the optical disc. When the information in the optical disc is being read in the working area, the optical disc is rotated at very high speed, so the optical disc may be fly out of the loading slot during operational process. Sometimes, defected material for making the optical disc may cause the optical disk to break when the optical disc is rotated at high speed and thus the pieces from the broken optical disk may escape from the loading slot of the optical disc device. This slot-in optical disc device is not provided with a cover structure that can open or close the loading slot so a user operating this type of optical disc device might be in danger.

Nowadays there are two main types of optical discs, i.e. 8-cm diameter disc and 12-diameter disc, but the slot-in optical disc device is usually designed for 12-cm diameter disc, not for 8-cm diameter disc. According to public technical literatures, it is known that through detecting the loading of the disc by optical sensors or two pairs of optical interceptors, the optical disc device is able to determine whether the disc is an 8-cm diameter disc or a 12-cm diameter disc. The device then is able to control a clamping/conveying device to hold and convey the optical disc according to different types of discs. There is another type of slot-in optical disc device having the similar structure as that mentioned above, but the principle of the technology is based on the time difference with which discs of different dimensions pass over the optical sensors. Furthermore, there is another different technology disclosed to determine the dimension of the disc passing through the optical sensor, which is related to the technology of the present invention. However, detailed description thereof is not going to be addressed hereinafter for brevity.

Seeing that there are such disadvantages in the open/close disc-conveying mechanism, the open/close loading slot mechanism and the adaptability for 12-cm diameter disc or 8-cm diameter disc in the conventional optical disc device, the present invention aims to resolve above problems and improve the conventional optical disc device.

SUMMARY OF THE INVENTION

The present invention is a transmission assembly with a lock gate structure for an optical disc device for preventing pieces of an optical disc from flying out of the optical disc device so as to resolve one or even more problems in the related prior art.

The objective of the present invention is to provide a transmission assembly cooperating with a budging mechanism and lock gate structure to open or close a loading slot of the optical disc device.

To attain the lock gate structure for the disc device to prevent the pieces of optical disc from flying out of the optical disc device, the optical disc device includes a budging mechanism, a transmission assembly, a disc holding down plate, and a lock gate structure. The budging mechanism moves by mechanically interfering with the optical disc entering the working area of the optical disc device to drive the transmission assembly that is mounted on one side of the optical device so as to further operate the disc holding down plate and the lock gate structure. With such mechanical connections, the working timing of each element in the optical disc device can be controlled so as to have the lock gate open or close the loading slot in the right time.

Other and further features, advantages and benefits of the invention will become apparent in the following description taken in conjunction with the following drawings. It is to be understood that the foregoing general description and following detailed description are exemplary and explanatory but are not to be restrictive of the invention. The accompanying drawings are incorporated in and constitute a part of this application and, together with the description, serve to explain the principles of the invention in general terms. Like numerals refer to like parts throughout the disclosure.

DETAILED DESCRIPTION OF THE PREFFERED EMBODIMENT

Figure 1:
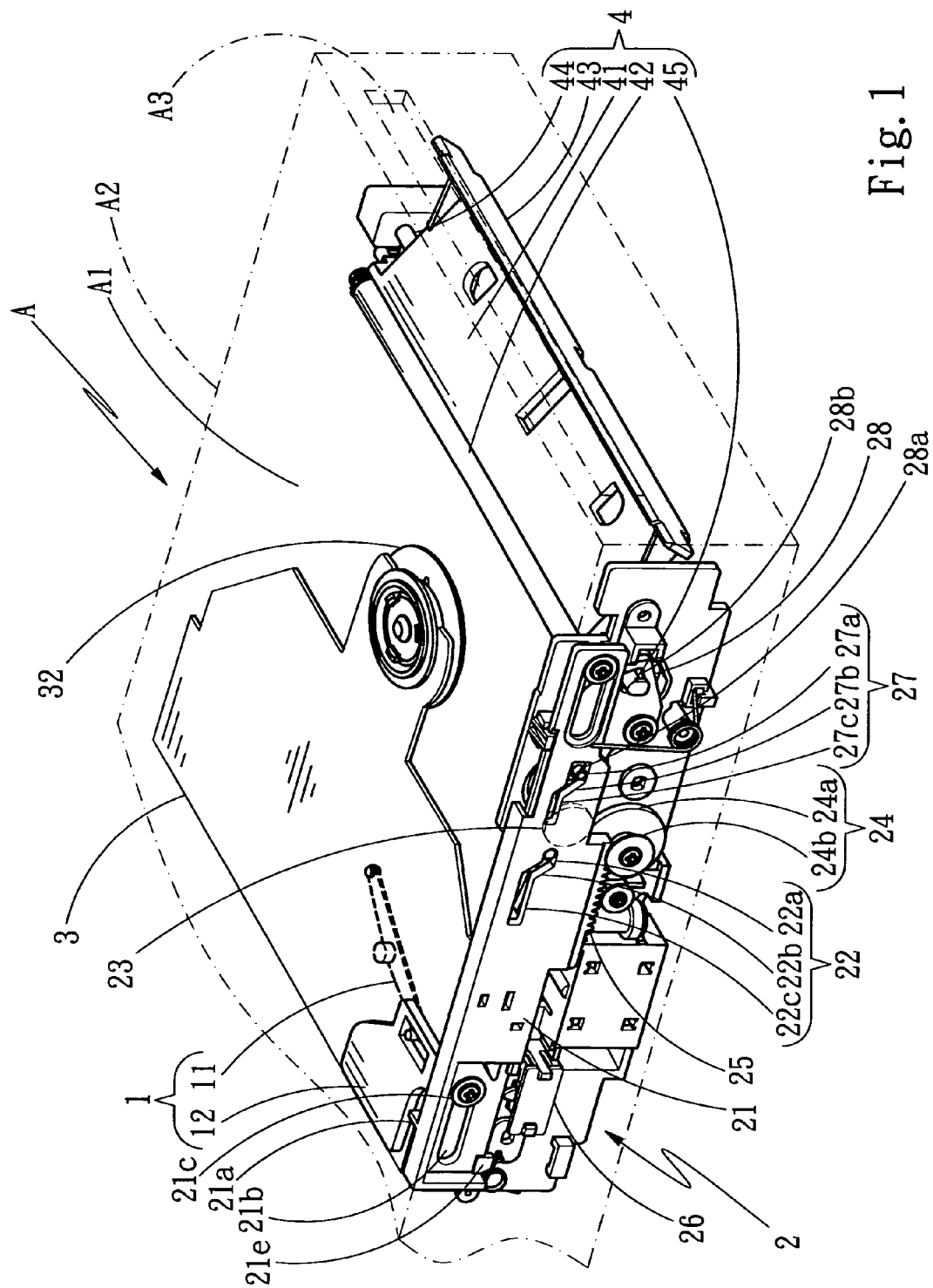
FIG. 1 is a perspective view of a main structure of an optical disc device according to the present invention.
Figure 2:
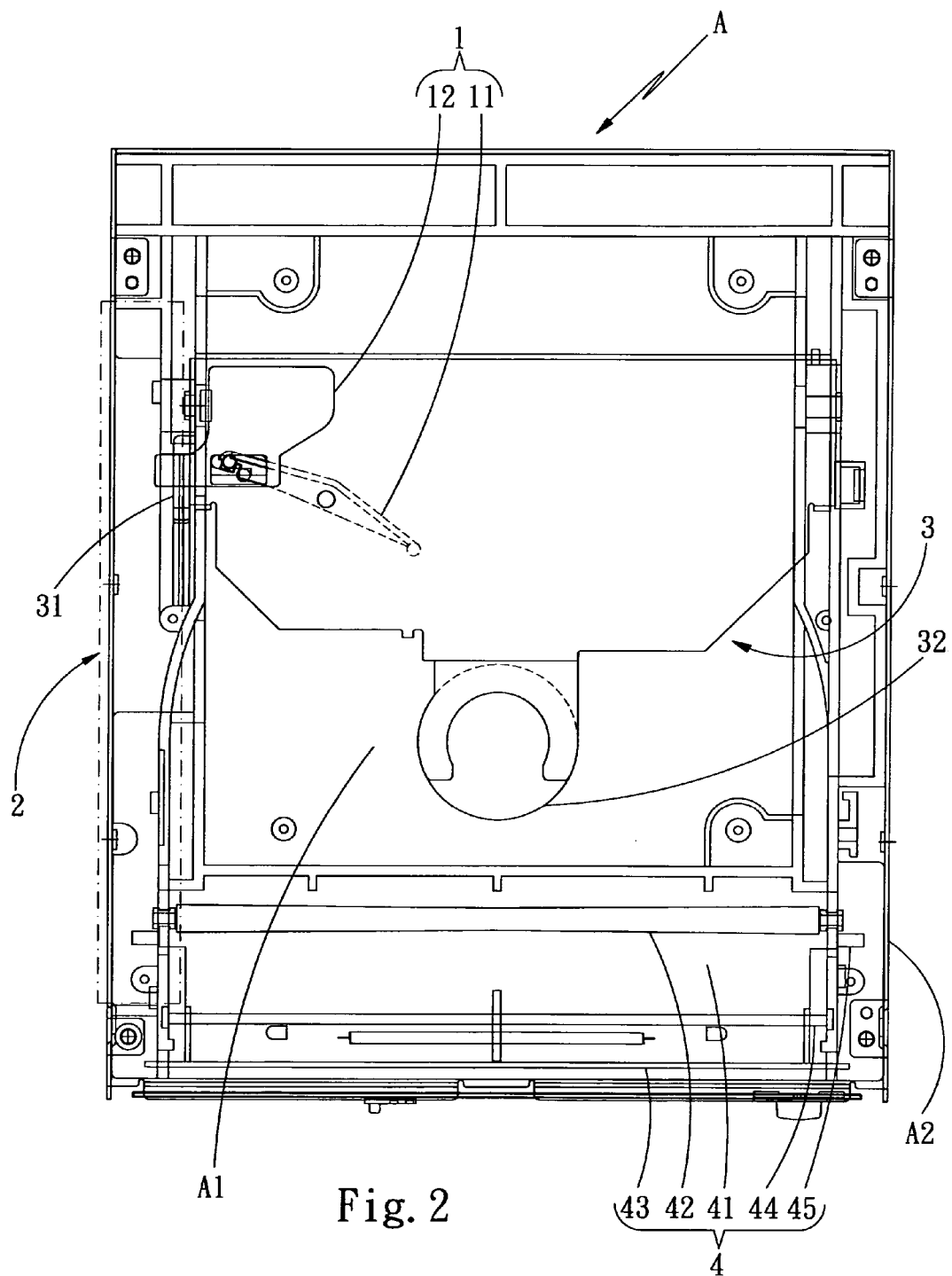
FIG. 2 is a top plan view of the lock gate structure of an optical disc device related to FIG. 1.

With reference to FIG. 1 and FIG. 2, an optical disc device (A) in accordance with the present invention, such as a DVD-ROM, a VCD-ROM, or a CD-ROM etc., includes a budging mechanism (1), a transmission assembly (2), a disc holding down plate (3), and a lock gate structure (4), all of which are placed on a main chassis (A2) of the optical disc device (A). By mechanical interfering with an optical disc entering into the optical disc device (A), the budging mechanism (1) starts to drive the transmission assembly (2) so as to further operate the disc holding down plate (3) and the lock gate structure (4).

Figure 3A:
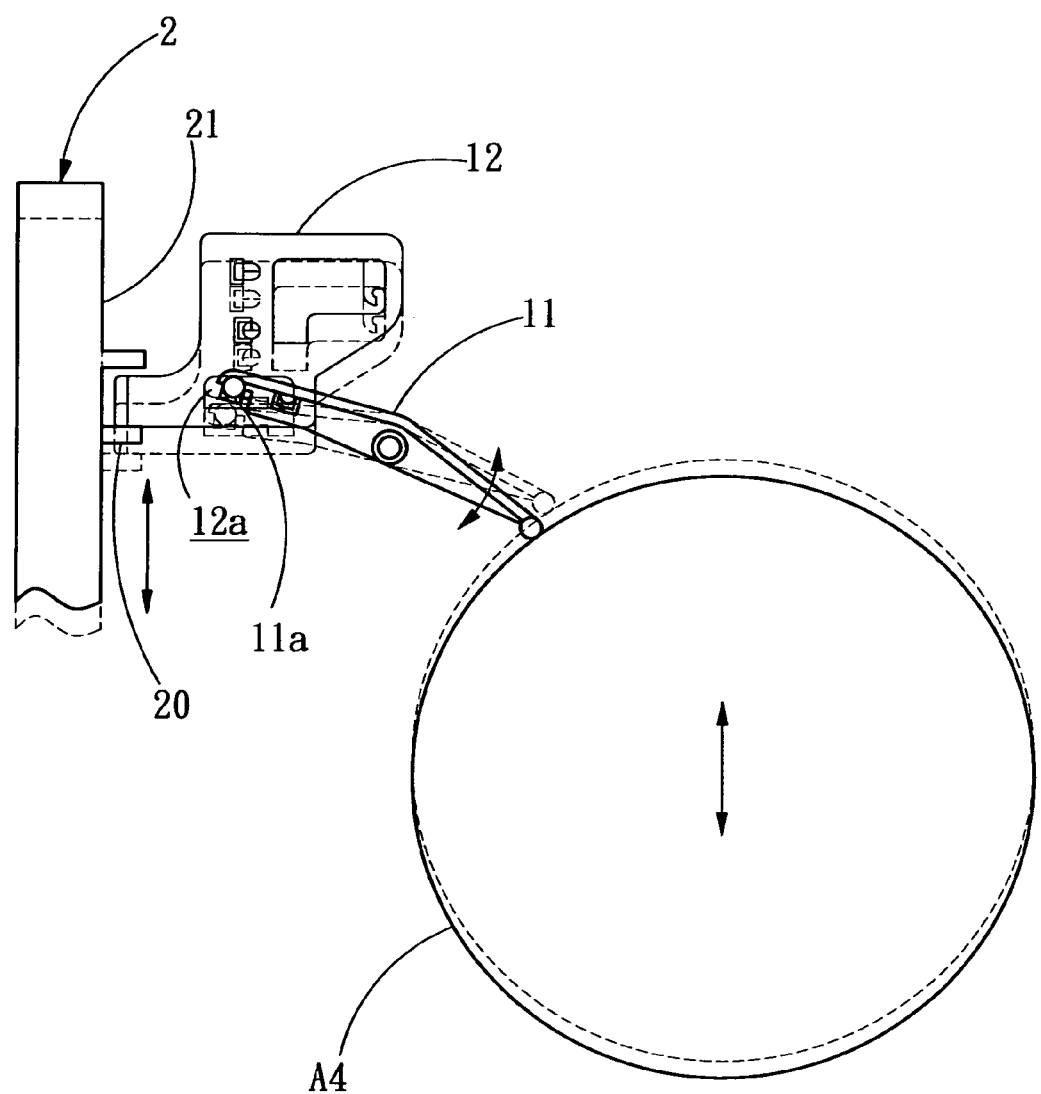
FIG. 3A and FIG. 3B are schematic views from different view angles showing a budging mechanism driving a transmission assembly.

As shown in FIG. 1 and FIG. 2, and with reference to FIG. 3A, the budging mechanism (1) has a compression shaft (11) and a pushing board (12). The compression shaft (11) is a shaft pivotally connected to the disc holding down plate (3) to form as a lever mechanism, and the pushing board (12) is placed on the disc holding down plate (3) as well to form as a sliding mechanism. One end of the compression shaft (11) extends to a working area (A1) of the optical disc device (A) to mechanically interfere with an optical disc (A4) in the working area (A1) (as shown in FIG. 3A). The other end of the compression shaft (11) is securely connected to the pushing board (12) to enable the pushing board (12) to slide while the compression shaft (11) is pivoted.

At the connective location of the compression shaft (11) and the pushing board (12), there is a raised bar (11a) formed on the one end of compression shaft (11) to upwardly extend into a hole (12a) defined in the pushing board (12). When the compression shaft (11) is moved as a leverage, the pushing board (12) is forced to slide forward due to the connection to the raised bar (11a), and the raised bar (11a) can also move widthways to avoid getting stuck.

When the optical disc (A4) is forcibly conveyed into the working area (A1), the optical disc (A4) interferes with the compression shaft (11) to force it to move so as to impel the pushing board (12) to slide forward.

Figure 3B:
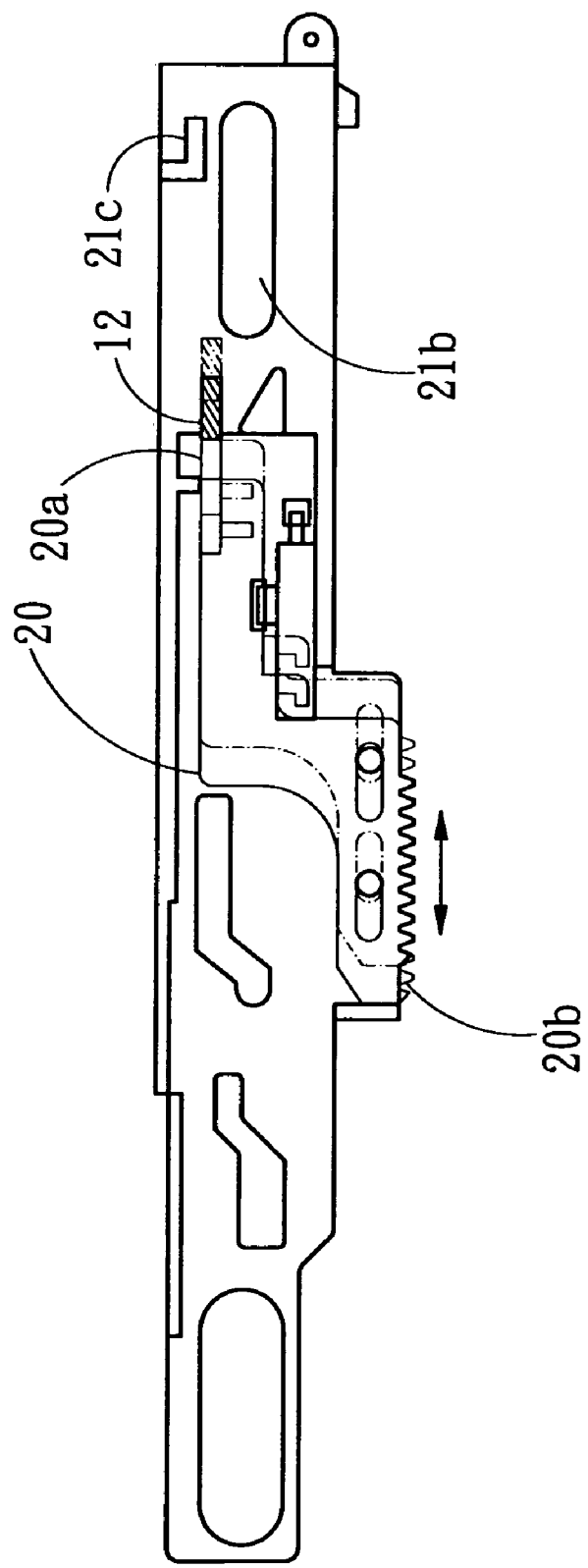

Referring to FIGS. 1~3A, and with reference to FIG. 3B, the transmission assembly (2) has a longitudinal plate (21) provided with a bracing chunk (21d) formed on one lateral side of the longitudinal plate (21), a bulge (21e) formed on the other lateral side of the longitudinal plate (21) and a row of sawteeth (25) formed on the bottom of the longitudinal plate (21). There is a zigzag shaped sliding sawteeth device (20) mounted on the lateral side of the longitudinal plate (21) and is able to slide in a first direction, e.g. longitudinally. A flange (20a) is formed on one end of the sliding sawteeth device (20) to cooperate with the sliding movement of the pushing board (12). A row of bottom sawteeth (20b) is formed on the other end of the sliding sawteeth device (20). The extreme front and extreme rear sliding positions of the row of bottom saws (20b) and the dimension thereof are to fit for the travel distance of the longitudinal plate (21). When the row of bottom saws (20b) is at the extreme front position, it can mesh with an front gear (24b) of a driving shaft (24) mounted on the one side of the main chassis (A2) so as to transmit the motive force from the driving shaft (24) to the longitudinal plate (21) to drive the longitudinal plate (21) sliding. The longitudinal plate (21) also has several limiting bores (21b) longitudinally defined in the longitudinal plate (21). Limiting columns (21c) extendedly formed on the side of a main chassis (A2) of the optical disc device (A) respectively pass through each limiting bore (21b) to engage the longitudinal plate (21). Accordingly, as shown in FIGS. 3A and 3B, the longitudinal plate (21) disposed on the side of the main chassis (A2) of the optical disc device (A) is confined to move longitudinally. The sliding sawteeth device (20) also can move longitudinally forward with the flange (20a) that is driven forward by the pushing board (12). When the sliding sawteeth device (20) is at the extreme front position in the sliding distance, it meshes with the front gear (24b) to drive the longitudinal plate (21) to move longitudinally forward.

Figure 4:
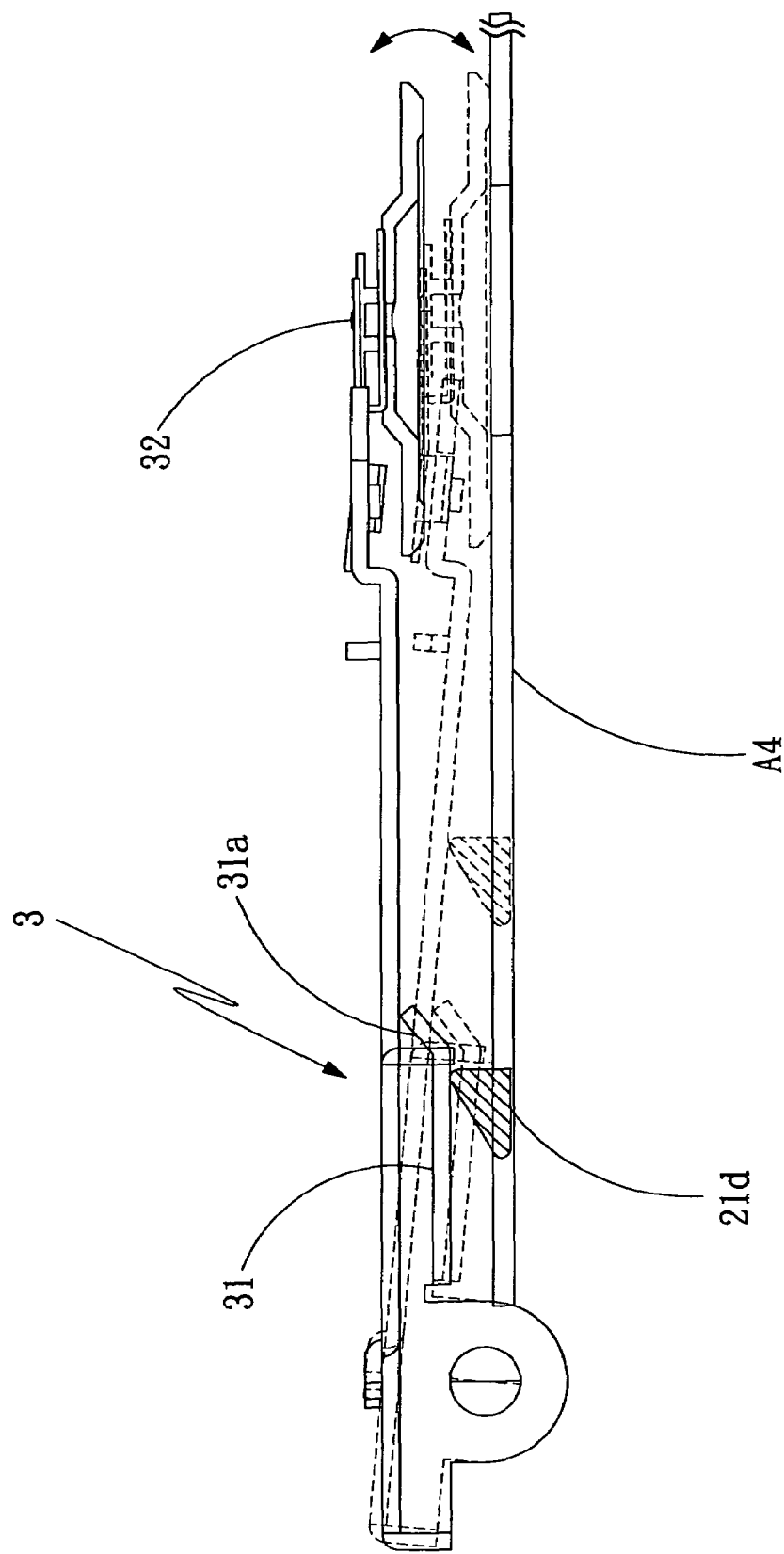
FIG. 4 is a schematic view showing a transmission assembly driving a disc holding down plate.

As shown in FIGS. 1~2, one edge of the disc holding down plate (3) is pivotally connected to the main chassis (A2) of the optical disc device (A), and the other opposite edge is extendedly formed as a holding down tray (32) to restrict the axial hole position of the optical disc (A4) in the working area (A1). With reference to FIG. 4 and referring to FIG. 2, the disc holding down plate (3) laterally extends to form a roof plate (31). An inclined plane (31a) is slantwise upward formed on the end of the roof plate (31) and cooperates with the bracing chunk (21d) formed on the side of the longitudinal plate (21) of the transmission assembly (2). When the bracing chunk (21d) is under the roof plate (31) to support it, the disc holding down plate (3) is in a release state. On the other hand, when the bracing chunk (21d) moves away from the roof plate (31), the disc holding down plate (3) is in a compressing state in which the optical disc (A4) is pressed by the holding down tray (32) with the axial hole under the center of the holding down tray (32).

The lock gate structure (4) includes a driving plate (41), a roller (42), a lock gate (43), a pivot (44) and a guiding column (45). One edge of the driving plate (41) is connected pivotally to the roller (41), and the other edge extendedly upward forms the lock gate (43). The guiding column (45) is formed on one side of the driving plate (41). The driving plate (41) is connected pivotally to the main chassis (A2) of the optical disc device (A) via the pivot (44) mounted on one face of the driving plate (41). The lock gate (43) is able to open or close the loading slot (A3) according to the movement of the transmission assembly (2) cooperating with the lock gate structure (4).

Figure 5A:
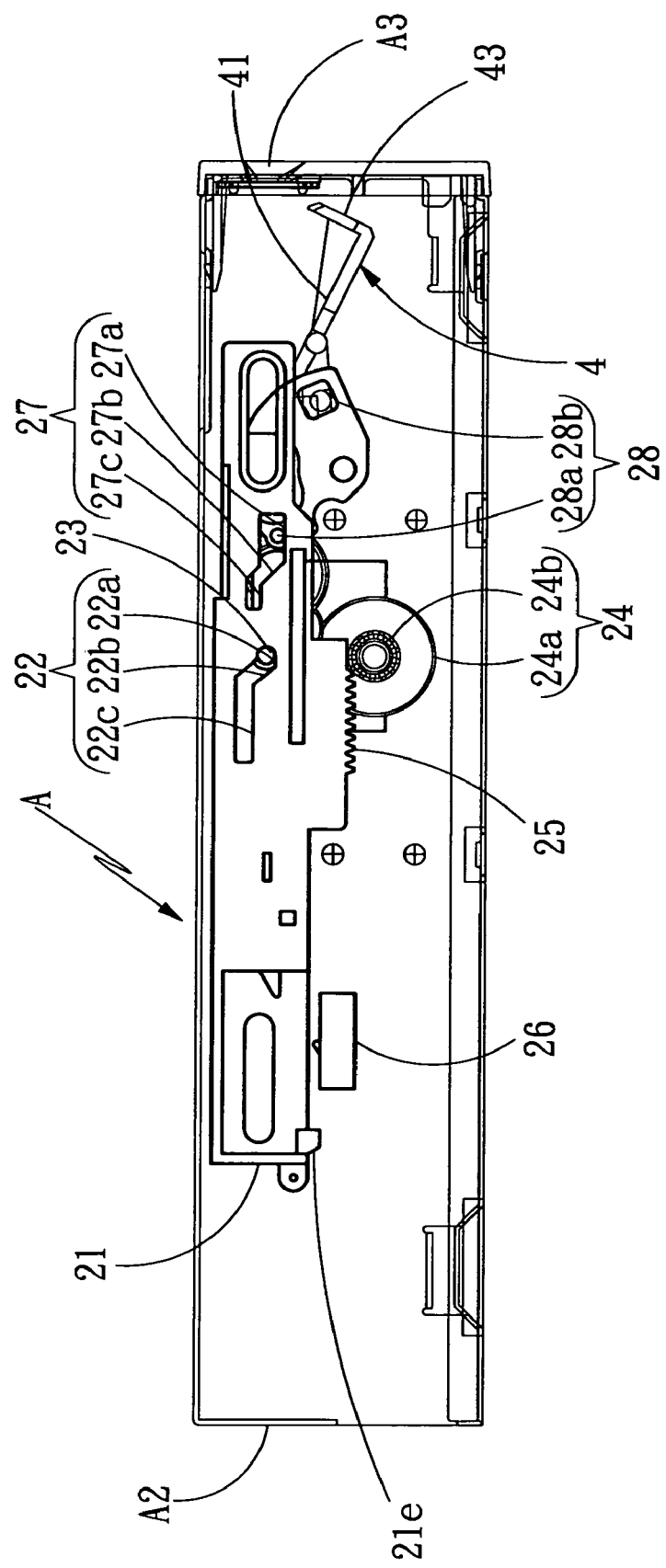
FIG. 5A is a schematic view of the transmission assembly in an initial state.
Figure 5B:
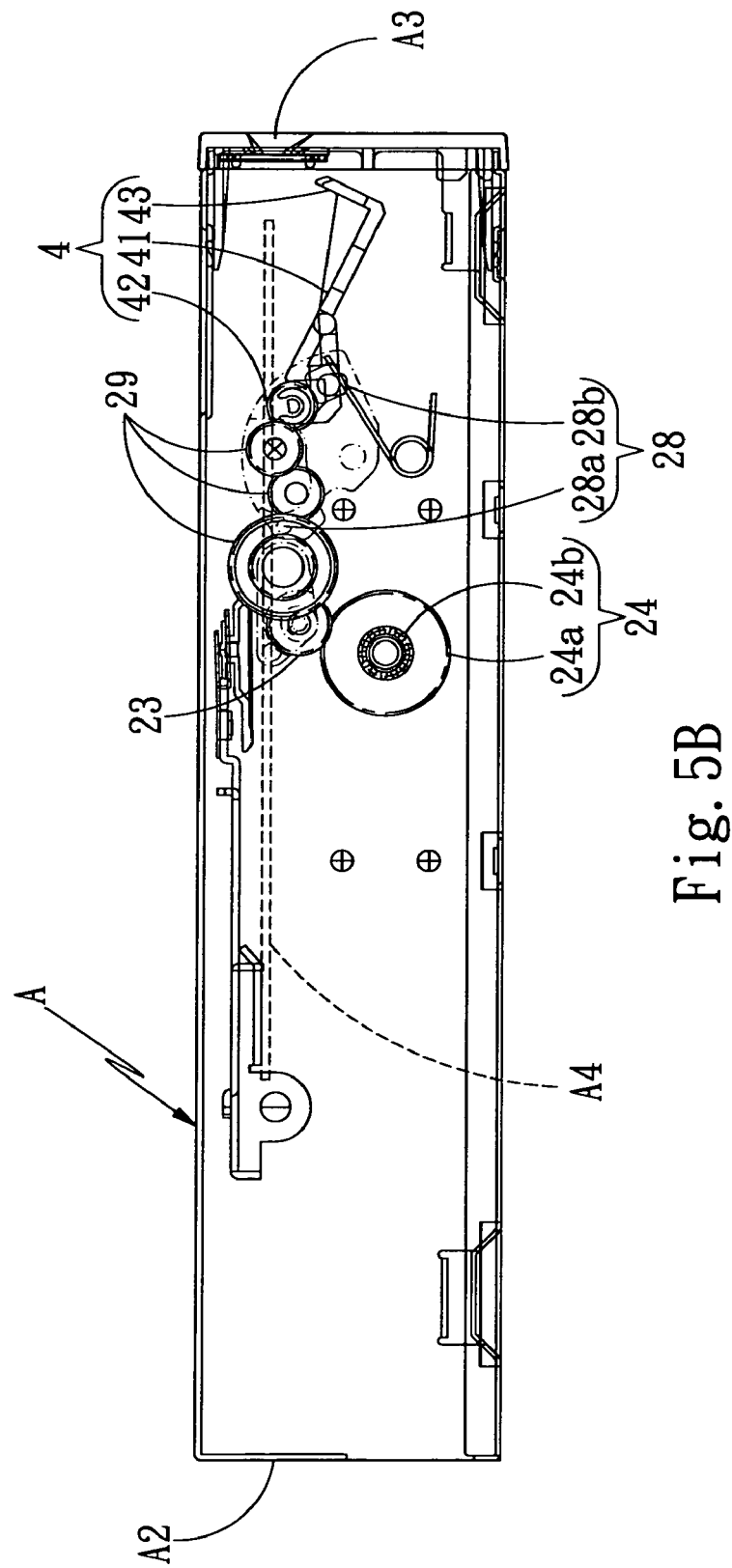
FIG. 5B is a schematic view of the relationship of gear wheels of the transmission assembly in the initial state.

With reference to FIG. 5A and FIG. 5B, the longitudinal plate (21) of the transmission assembly (2) further has a zigzag shaped first guiding hole (22) defined therein. The bottom horizontal hole of the first guiding hole (22) is defined as a bottom route (22a), the top horizontal hole of the first guiding hole (22) is defined as a top route (22c), and the inclined hole communicating with the bottom and top horizontal holes of the first guiding hole (22) is defined as a rising route (22b). The longitudinal plate (21) is engaged with a pivot of a floating gear (23) through the first guiding hole (22) such that the longitudinal movement of the longitudinal plate (21) can change the floating gear (23) location in the first guiding hole (22) and result in the different connective relationship between the floating gear (23) and related elements.

The floating gear (23) is mechanical connected to a driving axle (24) and a gearing wheel (29) respectively both of which separately are mounted on the main chassis. The driving axle (24) is constituted of a rear gear (24a) and the front gear (24b) having been mentioned above, both of which are coaxial with respect to the driving axle (24). With the rear gear (24a) meshed with the floating gear (23), the motive force from the driving axle (24) can be transmitted to the floating gear (23). Moreover, the location and length of the row of sawteeth (25) of the longitudinal plate (21) are to fit for the travel distance of the longitudinal plate (21). When the longitudinal plate (21) moves to a certain position in the travel route, the row of sawteeth (25) is meshed with the front gear (24b) of the driving axle (24) to transmit the motive force to the longitudinal plate (21).

A limit switch (26) is mounted on the side of the main chassis (A2) of the optical device (A) to cooperate with the bulge (21e) of the longitudinal plate (21). When the longitudinal plate (21) moves to the front position to contact the limit switch (26), the limit switch (26) switches off the power source to stop the movement of the longitudinal plate (21).

As shown in FIG. 5A and FIG. 5B, the longitudinal plate (21) of the transmission assembly (2) also has another zigzag shaped second guiding hole (27) defined therein. The bottom horizontal hole of the second guiding hole (27) is defined as a bottom route (27a), the top horizontal hole of the second guiding hole (27) is defined as a top route (27c), and the inclined channel communicating with the bottom and top horizontal holes of the second guiding hole (27) is defined as a rising route (27b). A pole (28a) formed on one face of a cam (28) that is connected pivotally to the side of the main chassis (A2) is engaged with the longitudinal plate (21) through the second guiding hole (27). There is a through hole (28b) defined in the cam (28), which is passed through by the guiding column (45) formed on the side of the driving plate (41). The pivot, pole (28a) and through hole (28b) of the cam (28) are located in special relative positions so as to control the lock gate (43) of the lock gate structure (4) to close or open the loading slot (A3) of the optical disc device (A).

When the longitudinal plate (21) is in the initial state, the row of sawteeth (25) is not meshed with the front gear (24b) of the driving axle (24). The pivot of the floating gear (23) is in the bottom route (22a) of the first guiding hole (22), and the floating gear (23) is mechanically connected to the driving axle (24) to transmit the motive force from the driving axle (24) to the gearing wheels (29). With one of the gearing wheels (29) meshed with the roller (42) of the lock gate structure (4), the motive force is transmitted to the roller (42). At that time, the pole (28a) of the cam (28) is also in the bottom route (22a) of the second guiding hole (27). Through the through hole (28b), the cam (28) is coupled with the guiding column (45) so as to move together to control the driving plate (41) of the lock gate structure (4) and make the lock gate (43) exist in the open state with respect to the loading slot (A3) of the optical disc device (A). The driving axle (24) also drives the roller (42) to rotate such that the roller (42) is able to carry the optical disc (A).

Figure 6A:
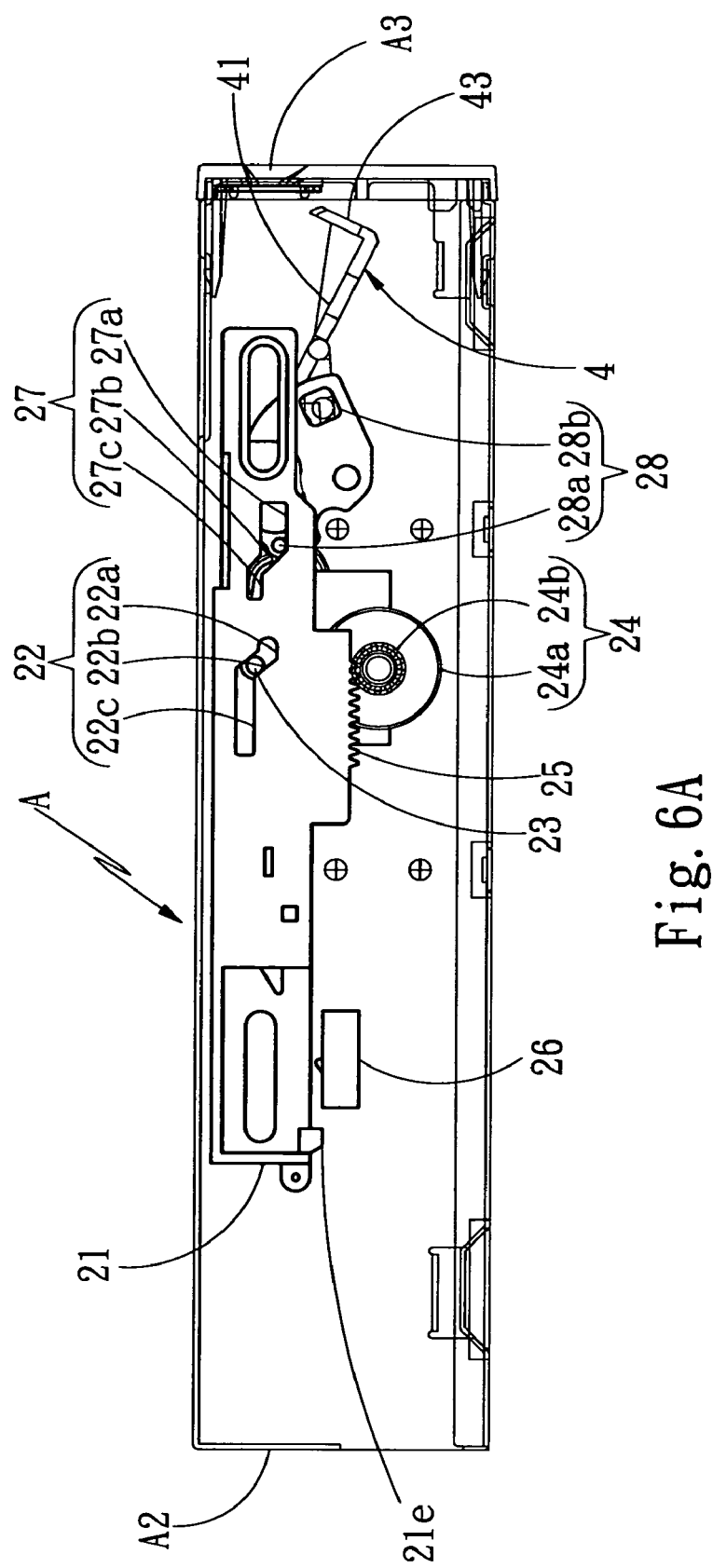
FIG. 6A is a schematic view of the transmission assembly in a transitional state.
Figure 6B:
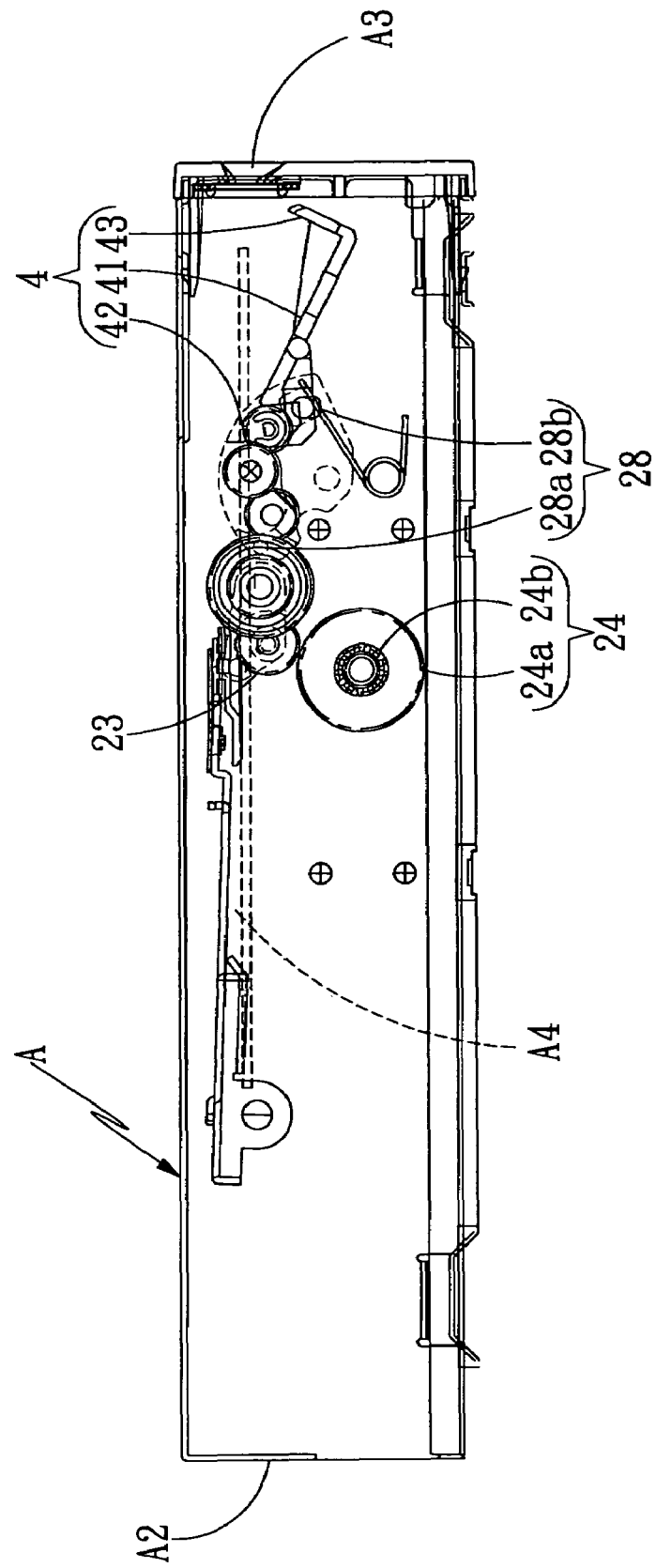
FIG. 6B is a schematic view of the relationship of gearing wheels of the transmission assembly in the transitional state.

With reference to FIG. 6A and FIG. 6B, when the longitudinal plate (21) is driven by the budging mechanism (1) to advance some distance, the row of the sawteeth (25) meshes with the front gear (24b) of the driving axle (24) and moves continuously by the driving of the driving axle (24). Then the pivot of the floating gear (23) enters into the rising route (22b) of the first guiding hole (22) and gradually departs from the driving axle (24). The pole (28a) of the cam (28) enters into the rising route (27b) of the second guiding hole (27) as well. Through the through hole (28b), the cam (28) couples with the guiding column (45) to move together to control the driving plate (41) of the lock gate structure (4) and make the lock gate (43) exist in the transitional state, in which the lock gate (43) is gradually closing the loading slot (A3) of the optical disc device (A). The roller (42) gradually departs from the read/write surface of the optical disc (A) without affecting the accessing information performance, and because of not being driven by the driving axle (24), the roller (42) does not rotate.

Figure 7A:
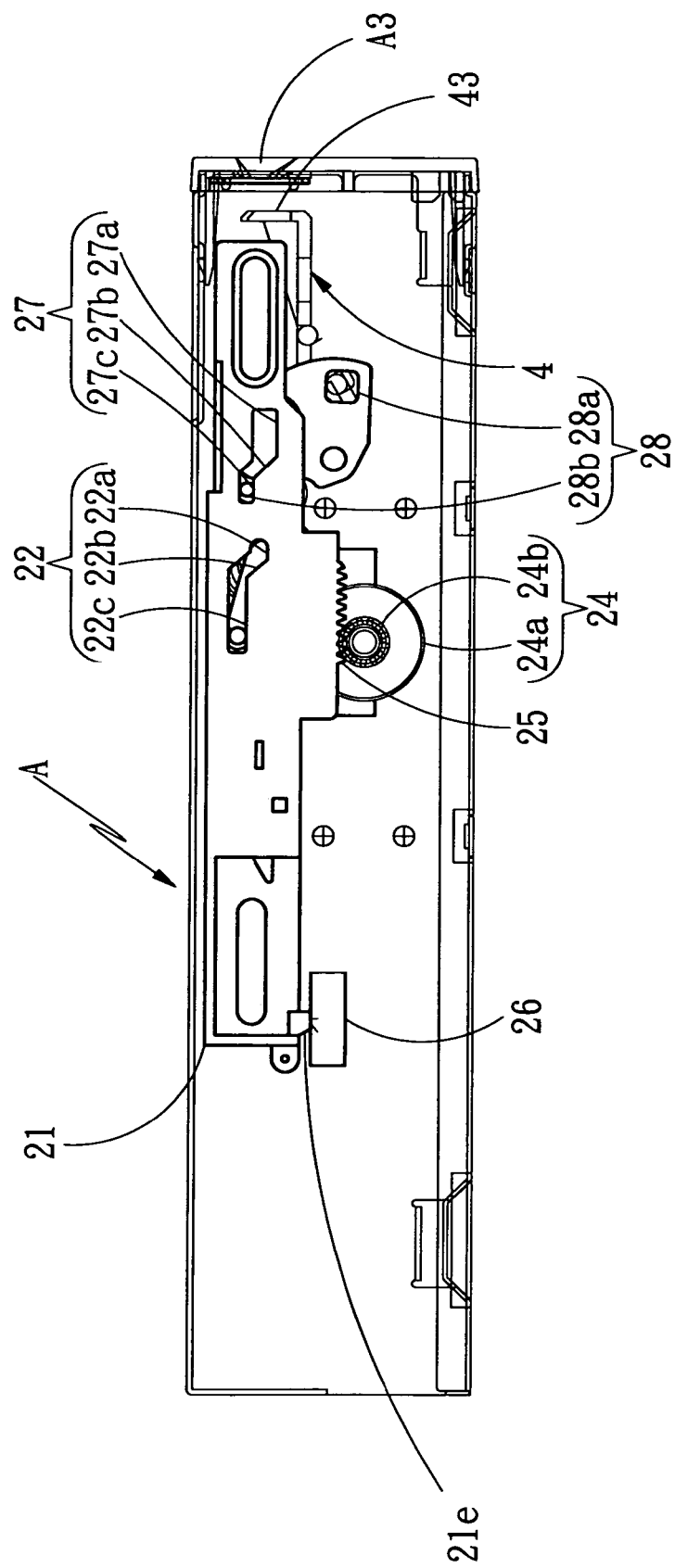
FIG. 7A is a schematic view of the transmission assembly in a final state.
Figure 7B:
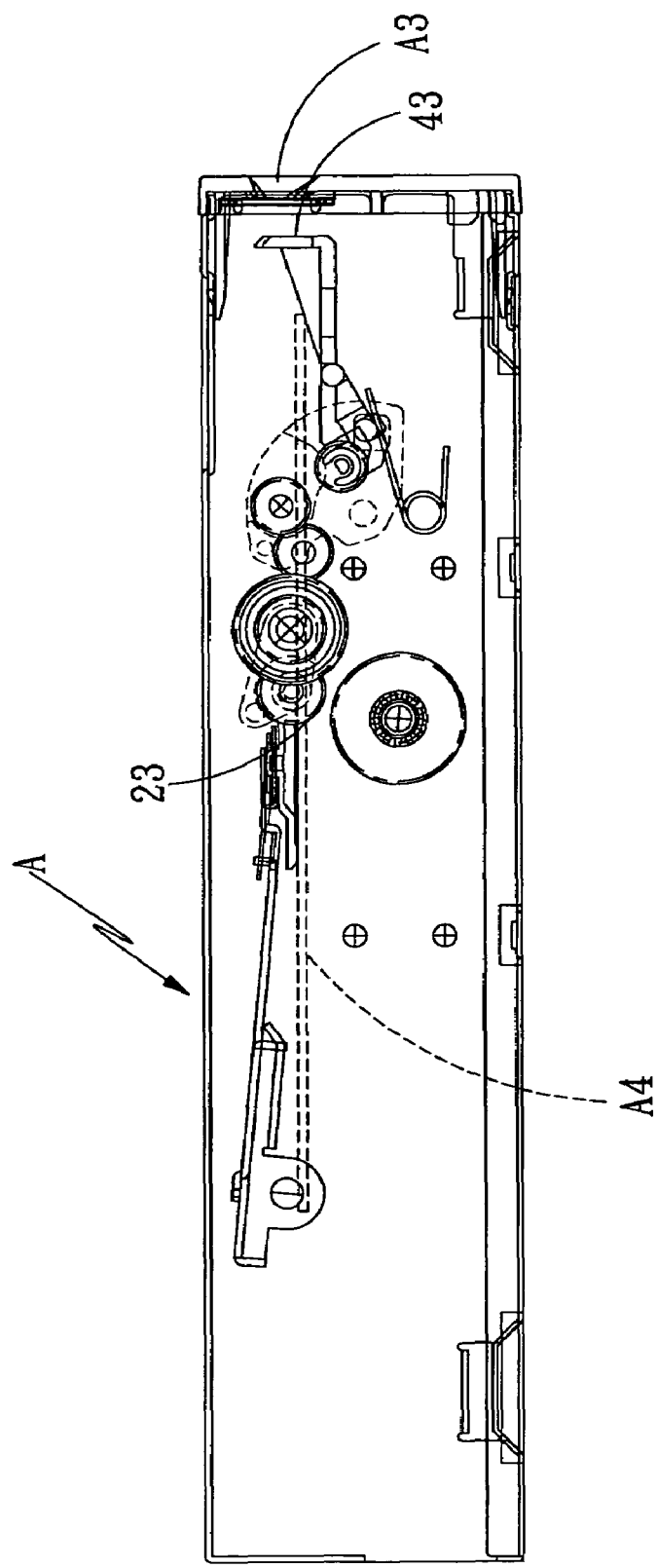
FIG. 7B is a schematic view of the relationship of gearing wheels of the transmission assembly in the final state.

With reference to FIG. 7A and FIG. 7B, when the longitudinal plate (21) is driven by the driving axle (24) and moves to the extreme position, the bulge (21e) of the longitudinal plate (21) contacts the limit switch (26), which then switches off the power source to stop the moving of the longitudinal plate (21).

As the longitudinal plate (21) is at the extreme position and stops moving, the disc-conveying procedure is finished and the optical disc (A4) is in the working area to be accessed. Moreover, if the crack or breakdown of the optical disc (A4) occurs in the accessing process, the pieces may fly out the working area, but since the loading slot (A3) has been closed by the lock gate structure (4), the pieces will be blocked by the lock gate (43) of the lock gate structure (4) without flying out of the loading slot (A3) to hurt people.

When the optical disc (A4) is ejected from the optical disc device (A), the same mechanisms operate reversely to eject the optical disc.

Figure 8:
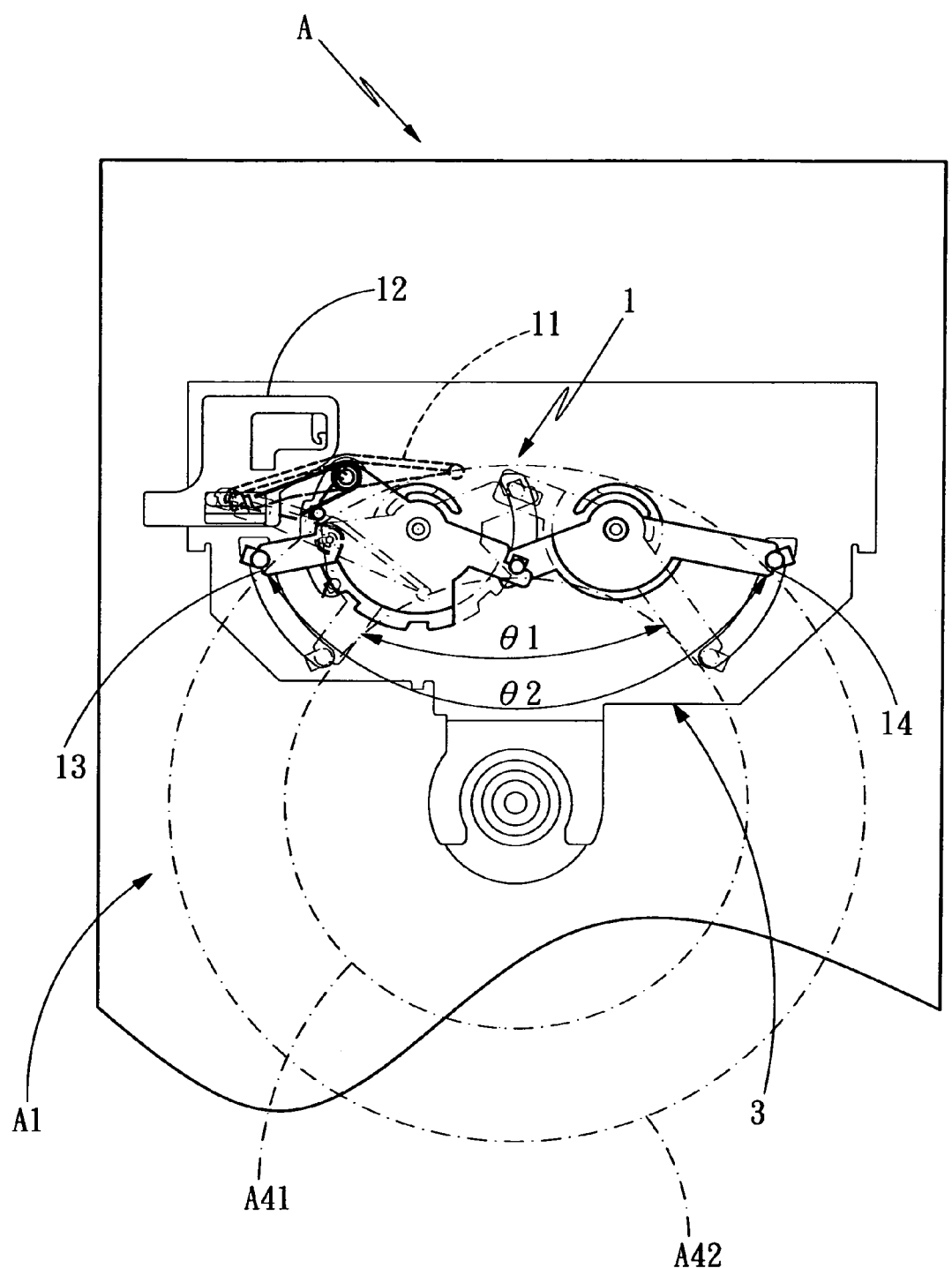
FIG. 8 is a schematic view of another embodiment of the present invention.

With reference to FIG. 8, the budging mechanism (1) is further provided with a first lever arm (13) and a second lever arm (14). The first lever arm (13) and the second lever arm (14) are in the relative positions and respectively pivotally connected to the disc holding down plate (3). The first lever arm (13) and the second lever arm (14) can gyrate in the range of a minimum included angle θ1 to a maximum included angle θ2. The minimum included angle θ1 and the maximum included angle θ2 are respectively to fit for an 8-cm diameter disc (A41) and a 12-cm diameter disc (A42) in the working area of the optical disc device (A). Furthermore, the compression shaft (11) is pivotally connected to the first lever arm (13) to form as a lever mechanism and the pushing board (12) is mounted on the disc holding down plate (3) to form as a slide mechanism. One end of the compression shaft (11) extends to the working area to interfere mechanically with the optical disc entering the working area, as shown in FIG. 3A and FIG. 3B, and the other end is connected to the pushing board (12) to impel the pushing board (12) to slide.

Figure 9:
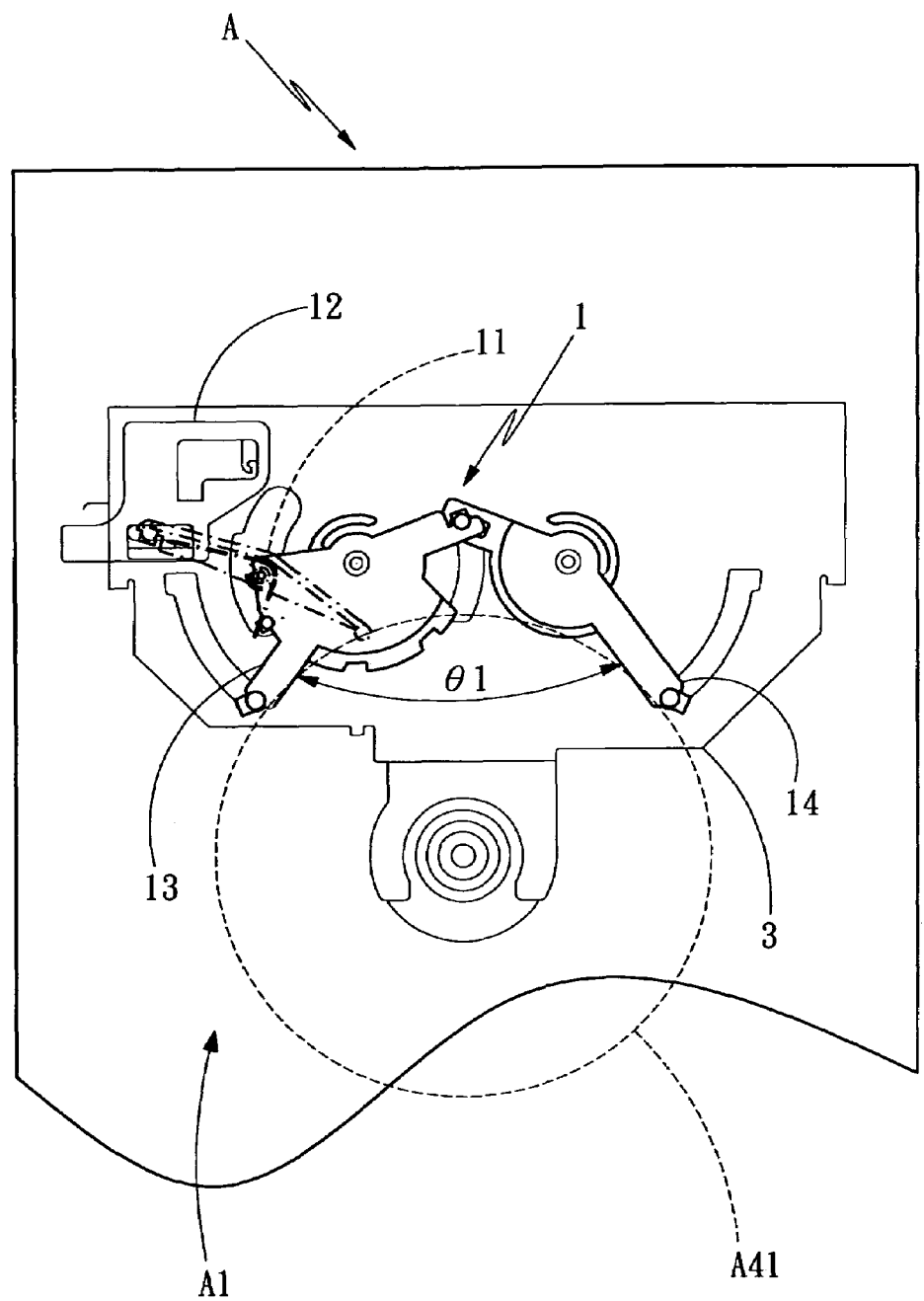
FIG. 9 is a schematic view of the embodiment according to FIG. 8 in which an 8-cm diameter disc interferes with the budging mechanism.

With reference to FIG. 9, when the 8-cm diameter disc is forcibly conveyed into the working area (A1), it interferes with the compression shaft (11) and make the compression shaft (11) take a lever motion to drive the pushing board (12) until the disc contacts the first lever arm (13) and the second lever arm (14) existing at minimum included angle θ1.

Figure 10:
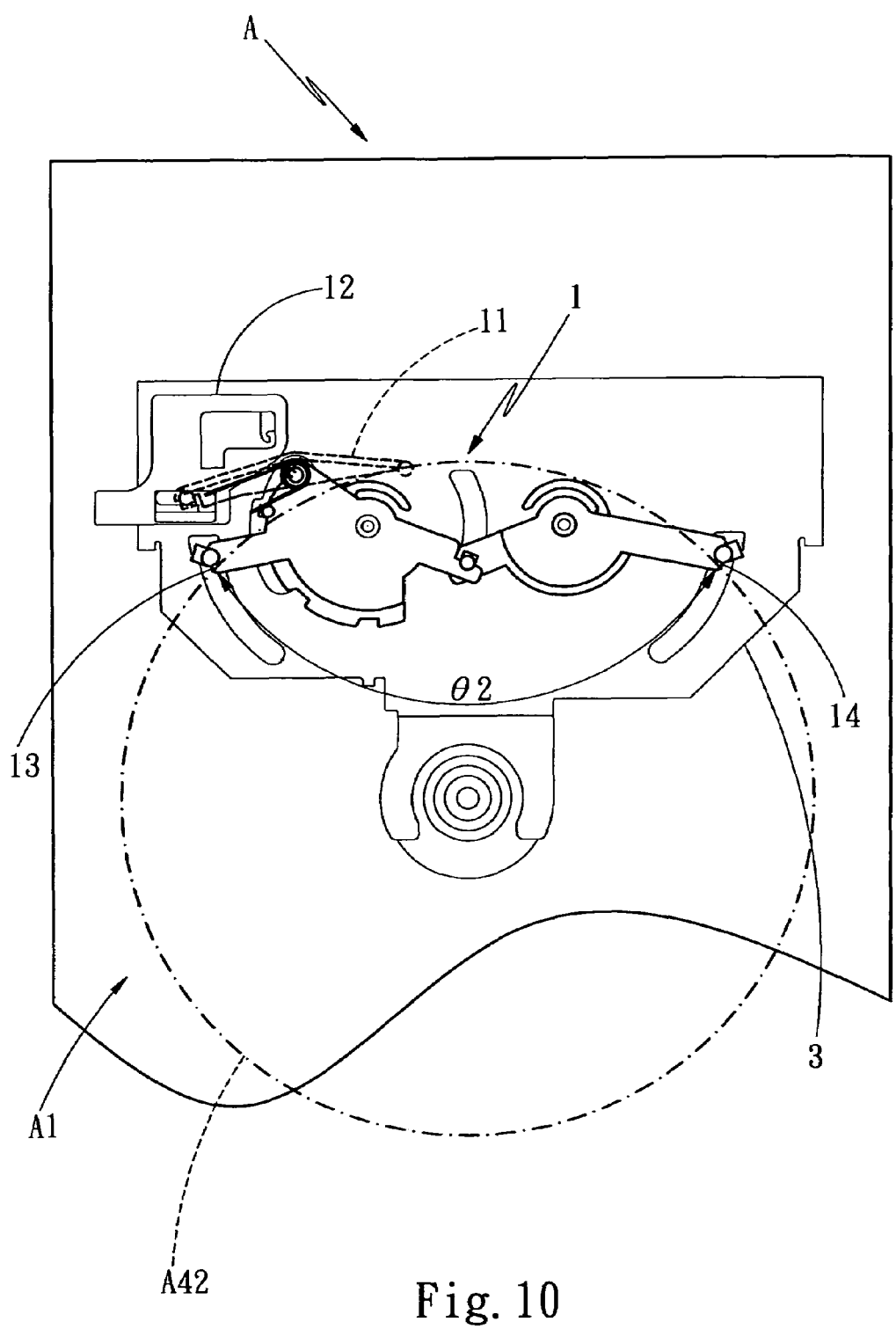
FIG. 10 is a schematic view of the embodiment according to FIG. 8 in which a 12-cm diameter disc interferes with the budging mechanism.

With reference to FIG. 10, when the 12-cm diameter disc is forcibly conveyed into the working area (A1), it first contacts the first lever arm (13) and the second lever arm (14) existing at minimum included angle θ1 and then gradually pushes them to expand. During the expanding process the compression shaft (11) takes a translational motion. Then the 12-cm diameter disc also interferes with the compression shaft (11) to have it take a lever motion to promote the pushing board (12) to slide forward until the maximum included angle θ2 is attained.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. An optical disc device for preventing the pieces of exploded disc from flying out of the optical disc device, comprising:
   a main chassis;
   a disc holding down plate, one edge of which is pivotally connected to the main chassis;
   a budging mechanism having a compression shaft and a pushing board, the pushing board mounted on the disc holding down plate, the compression shaft pivotally connected to the disc holding down plate, one end of the compression shaft extending to the working area to mechanically interfere with an optical disc entering the working area, the other end of the compression shaft connected to the pushing board and driving the pushing board to slide;

a transmission assembly including a longitudinal plate and a driving axle respectively mounted on one side of the main chassis, one side face of the longitudinal plate provided with a sliding sawteeth device that is able to slide in one dimensional direction and match with the sliding of the pushing board, one end of the sliding sawteeth device extending to form a flange to cooperate with the pushing board, the other end of the sliding sawteeth device having a row of bottom sawteeth, dimension and the extreme sliding positions of the bottom sawteeth fitting for a sliding distance of the longitudinal plate, in a first extreme sliding position the bottom sawteeth meshing with a front gear set up on the driving axle to transmit motive force from the driving axle to the longitudinal plate such that the longitudinal plate is able to move in one dimensional direction; and a lock gate structure having a driving plate, one edge of the driving plate pivotally connected to a roller, the other edge of the driving plate extending upward to form a lock gate, the driving plate connected pivotally to the main chassis via a pivot for opening or closing a loading slot of the optical disc device;

wherein the longitudinal plate further has a zigzag shaped first guiding hole defined therein in which the bottom horizontal hole of the first guiding hole is defined as a bottom route, the top horizontal hole of the first guiding hole is defined as a top route, the inclined hole communicating with the bottom and top holes of the first guiding hole is defined as a rising route; through the first guiding hole, the longitudinal plate engages with a pole formed on a face of a cam which is pivotally connected to the main chassis; the cam also has a through hole defined therein to engage with a guiding column formed on one side of the driving plate of the lock gate structure; the pole and the through hole of the cam are located in relative positions such that during the movement of the pole from the bottom route to the top route, the cam drives the lock gate to close the loading slot and during the movement of the pole from the top route to the bottom route, the cam drives the lock gate to open the loading slot.

2. The optical disc device according to claim 1, wherein the longitudinal plate has multiple limiting bores defined therein and passed through respectively by multiple limiting columns extendedly formed on one side of the main chassis.

3. The optical disc device according to claim 1, wherein the longitudinal plate has a zigzag shaped second guiding hole defined therein in which the bottom horizontal hole of the second guiding hole is defined as a bottom route, the top horizontal hole of the second guiding hole is defined as a top route, the inclined hole communicating the bottom and top holes of the second guiding hole is defined as a rising route; through the second guiding hole, the longitudinal plate engages with a pivot of a floating gear and with the movement of the longitudinal plate, the pivot of the floating gear changes its location in the second guiding hole and results in differently mechanically connective relationship between itself and related elements so as to selectively start or stop the rotation of the roller of the lock gate structure.

4. The optical disc device according to claim 3, wherein the floating gear is mechanically connected to the driving axle so as to transmit the motive force from the driving axle to the floating gear.

5. The optical disc device according to claim 4, wherein the floating gear is mechanically connected to the driving axle and a gearing wheel respectively mounted on the side of the main chassis; the driving axle has a rear gear coaxial with the front gear; and with the rear gear meshed with the floating gear the motive force is transmitted from the driving axle to the floating gear.

6. The optical disc device according to claim 3, wherein the floating gear is mechanically connected to a gearing wheel so as to transmit the motive force from the floating gear to the roller of the lock gate structure.

7. The optical disc device according to claim 3, wherein the floating gear is mechanically connected to the driving axle and a gearing wheel respectively to transmit the motive force from the driving axle to the roller of the lock gate structure.

8. The optical disc device according to claim 1, wherein a row of sawteeth is formed on the bottom of the longitudinal plate; the dimensions and the positions of sawteeth are to fit for the sliding distance of the longitudinal plate; and in the partial sliding distance of the longitudinal plate, the row of the sawteeth is meshed with the driving axle so as to transmit the motive force from the driving axle to the longitudinal plate.

9. The optical disc device according to claim 1, wherein one edge of the disc holding down plate is pivotally connected to the main chassis; an opposite edge of the disc holding down plate extends to form a holding down tray for restricting the axial hole of the optical disc; one lateral side of the disc holding down plate is extends to form a roof plate; one front end of the roof plate forms an upward inclined plane; and a bracing chunk is formed on the side of the longitudinal plate to selectively support the roof plate and remove from the roof plate to control the disc holding down plate to selectively release the optical disc and compress the optical disc.

10. The optical disc device according to claim 1, wherein a bulge is formed on the side of the longitudinal plate; a limit switch is mounted on the side of the main chassis of the optical disc device; and when the longitudinal plate moves to the first extreme position, the bulge touches the limit switch to cut off the power source so as to stop the movement of the longitudinal.

* * * * *